United States Patent
Zelenka

[11] Patent Number: 5,883,746
[45] Date of Patent: Mar. 16, 1999

[54] APPARATUS FOR BEAM SPLITTING

[75] Inventor: Thomas Zelenka, Mönkeberg, Germany

[73] Assignee: Linotype-Hell AG, Kiel, Germany

[21] Appl. No.: 809,943

[22] PCT Filed: Sep. 13, 1995

[86] PCT No.: PCT/DE95/01252

§ 371 Date: Mar. 20, 1997

§ 102(e) Date: Mar. 20, 1997

[87] PCT Pub. No.: WO95/09565

PCT Pub. Date: Mar. 28, 1996

[30] Foreign Application Priority Data

Sep. 22, 1994 [DE] Germany .......................... 44 33 763.9

[51] Int. Cl.[6] .................................................. G02B 27/14
[52] U.S. Cl. .......................... 359/629; 359/639; 359/726
[58] Field of Search .................................. 359/629, 636, 359/638, 726, 728, 220, 221

[56] References Cited

FOREIGN PATENT DOCUMENTS

0 054170  5/1985  European Pat. Off. .
G 02 B 27/10  4/1993  Germany .

Primary Examiner—Georgia Epps
Assistant Examiner—Dawn-Marie Bey
Attorney, Agent, or Firm—Hill & Simpson

[57] ABSTRACT

An apparatus for splitting a light beam into two sub-beams is formed of a stationary light source for generating a light beam, of a first polarization converter and of a deflection unit rotating around the optical axis in which two sub-beams are generated from the light beam. The deflection unit contains a polarization beam splitter, a following, second polarization converter and a reflector that is preferably designed as a prism. An automatic correction of positional offsets of the sub-beams is implemented in the deflection unit since the polarization beam splitter or the deflection unit is tilted and/or the lenses are shifted with adjustment drives. The positional offsets of the sub-beams are measured in their focus plane, and corresponding correction values are transmitted with a transformer to the adjustment drives in the rotating deflection unit.

34 Claims, 5 Drawing Sheets

APPARATUS FOR BEAM SPLITTING

BACKGROUND OF THE INVENTION

Field of the Invention

The invention is in the field of reproduction technology and is directed to an apparatus for splitting a light beam into two sub-beams.

Such an apparatus for beam splitting can be employed, for example, in a light beam scanner unit for originals scanner devices or recording devices.

In an originals scanner device, also referred to as an input scanner, the light beam sweeps the original to be scanned point-by-point and line-by-line, and the scan light reflected from or allowed to pass by the original is converted into an image signal in an optoelectronic transducer.

In a recording device, also referred to as a recorder, exposer or output scanner, the light beam is intensity-modulated by an image signal, and the intensity-modulated light beam is conducted over a light-sensitive recording material point-by-point and line-by-line.

In a scanner or recorder device of the flatbed type, the holder for the original or, the recording material is a flat surface moved relative to the light beam scanner unit that the light beam sweeps point-by-point and line-by-line.

In a scanner or recorder device of the inside drum type, the holder for the original or, the recording material is designed as a stationary trough shaped like a cylinder segment. The light beam scanner unit moves parallel to the longitudinal axis of the trough, and the light. beam is radially conducted over the trough point-by-point and line-by-line perpendicular to the longitudinal axis.

DE-A-41 28 468 already discloses a light beam scanner unit with an apparatus for splitting a light beam into two sub-beams in a recording device of the inside drum type. The beam splitter apparatus comprises essentially a stationary light source and a deflection unit that turns around an optical axis. The deflection unit is composed of a polarization beam splitter, a polarization converter and a plane mirror.

The polarized light coming from the stationary light source is divided into two sub-beams in the rotating deflection unit by the polarization beam splitter, these two sub-beams being intensity-modulated by an image signal. The two intensity-modulated sub-beams emerge radially offset from the deflection unit, are focussed onto a recording material fixed in an exposure trough and expose the recording material point-by-point and line-by-line. Two lines on the recording material are exposed with the two intensity-modulated sub-beams per revolution, a high recording speed being achieved as a result thereof.

In order to also achieve a high recording quality, the two sub-beams dare not exhibit any positional offset in the recording plane perpendicular to the line direction compared to a rated position in which the two sub-beams are congruent. As a result of such a positional offset, namely, the two lines exposed on the recording material would not proceed equidistantly from one another, and disturbing fluctuations in tonal value that considerably diminish the recording quality would result.

The known beam splitter apparatus has the disadvantage that the light beam generated in the stationary light source must be very precisely adjusted in the direction of the optical axis or, of the rotational axis of the deflection unit so that, after half a revolution of the deflection unit, the sub-beams are incident on a line in the recording plane perpendicular to the line direction without positional offset. When the light beam in the known beam splitter apparatus is not aligned exactly, the two sub-beams, however, exhibit an oppositely directed positional offset relative to the rated position, i.e. the beam positions lies to the left and right of the rated position, as a result whereof a relatively big positional error arises. An exact adjustment, however, is involved and is lost over time, so that a re-adjustment is potentially required. Disturbing positional offsets of the sub-beams also arise when the polarization beam splitter and the plane mirror in the deflection unit are not aligned exactly relative to one another due to manufacturing tolerances. For compensation of errors that have arisen due to an imprecise alignment of the optical components, the known beam splitter apparatus comprises, for example, an adjustable optical adjustment mechanism in the form of a camera wedge arranged in the beam path between light source and deflection unit. Such an adjustment, however, is relatively involved and imprecise, since it can only be carried out when the beam splitter apparatus is not rotating.

SUMMARY OF THE INVENTION

It is therefore an object of the present invention to improve an apparatus for beam splitting such that disturbing relative position errors of the sub-beams relative to one another are automatically corrected and such that an exact beam splitting is achieved.

According to the invention, an apparatus is provided for splitting a light beam into two sub-beams. The stationary light source generates a light beam along an optical axis. An objective is arranged in the optical axis in front of the light source. A deflection unit is charged by the light beam and is rotatable around the optical axis. The deflection unit has a polarization beam splitter for dividing the polarized light beam into a reflected, polarized light component that proceeds substantially perpendicular to the optical axis as a first sub-beam and into a polarized light component that is allowed to pass and proceed substantially in a direction of the optical axis. The deflection unit further has a polarization converter and a reflector arranged on the optical axis behind the polarization beam splitter for turning the light component as it passes through the converter by 90° in phase with respect to the polarization direction and for reflecting the light component back onto the polarization beam splitter where it is reflected at the polarization beam splitter to form a second sub-beam. Respective focus units are provided for the first and second sub-beams. In one embodiment of the invention for correcting relative position offsets of the first and second sub-beams relative to one another, the reflector comprises a prism with at least two mirror faces residing at an angle relative to one another for reflecting onto the polarization converter the light component passing through the polarization converter and into the prism. In another embodiment of the invention, the unit is provided for determining relative positional offset of at least one of the sub-beams at a reference surface impinged on by the sub-beam and for determining correction values corresponding to the determined positional offsets. A unit is provided for changing an angle of inclination of at least one of the polarization beam slitters relative to the optical axis or for shifting the focusing units for the sub-beams dependent on the correction values for correcting relative positional offsets of the sub-beams.

The invention is explained in greater detail below with reference to FIGS. 1 through 5.

DESCRIPTION OF THE PREFERRED EMBODIMENTS

Figure 1:
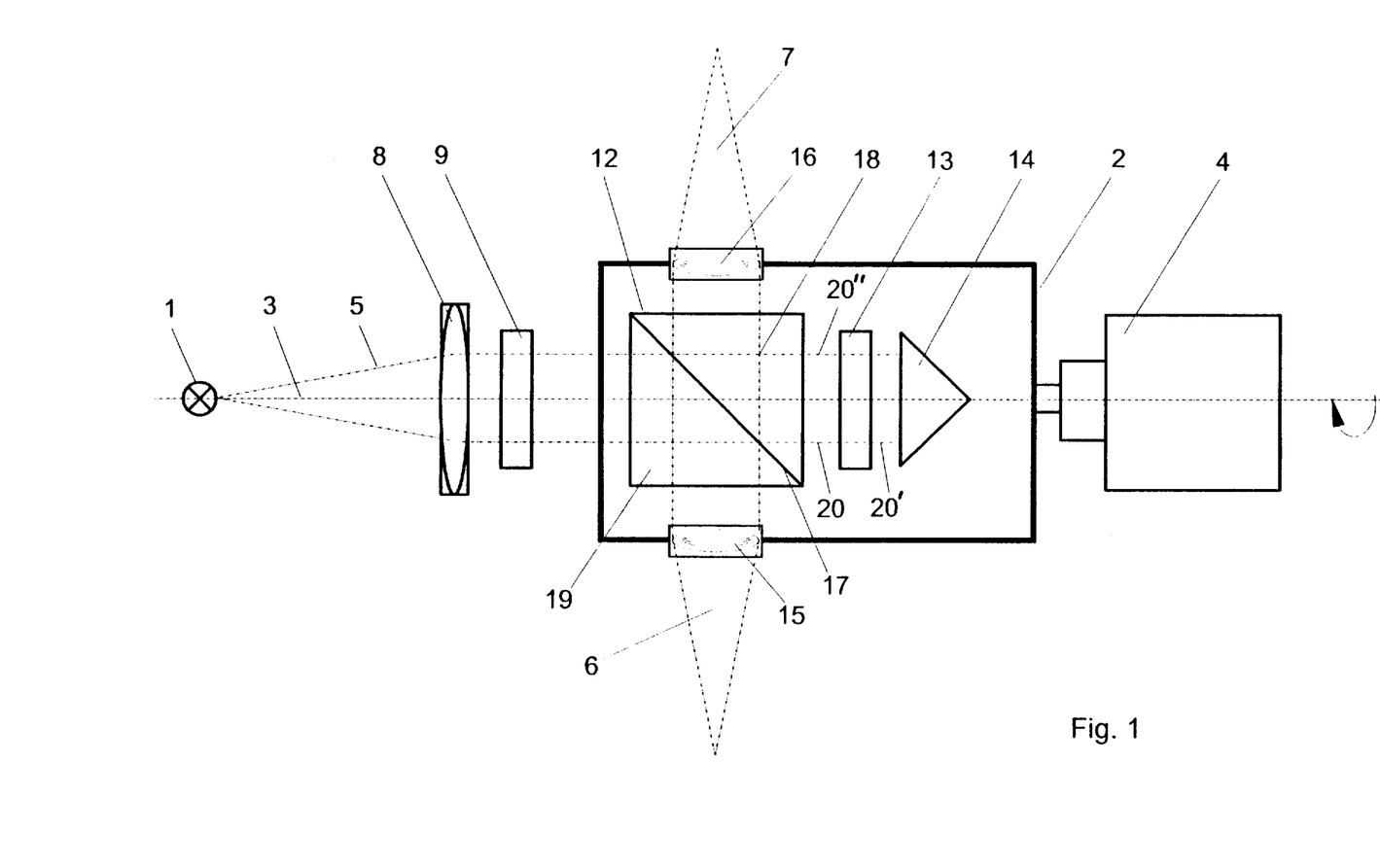
FIG. 1 is an exemplary embodiment of a beam splitter apparatus.

FIG. 1 shows an exemplary embodiment of a beam splitter apparatus that is composed of a stationary light source 1 and of a deflection unit 2. The stationary light source 1 is, for example, a semiconductor laser diode. The deflection unit 2 is seated in rotatable fashion around an optical axis 3 and is driven by a motor 4. A light beam 5 that proceeds parallel to the optical axis 3 is generated in the stationary light source 1. The light beam 5 is divided in the deflection unit 2 into two sub-beams 6, 7 that proceed radially relative to the optical axis 3.

The beam splitting can be implemented with a non-polarized or with a polarized light beam 5. In the exemplary embodiment, the light source 1 generates a linearly polarized light beam 5 that is converted into a circularly polarized light beam 5. Any other light source that generates a non-polarized light beam can also be fundamentally used in conjunction with a polarizer to generate the linearly or circularly polarized light beam 5.

A lens system 8 and a first polarization converter 9 for the transformation of a linear polarization into a circular polarization are arranged on the optical axis between the light source 1 and the deflection unit 2. The first polarization converter 9 can be omitted when a non-polarized light beam 5 or a light beam 5 that is already circularly polarized is utilized for the beam splitting.

In the illustrated exemplary embodiment, the lens system 8 generates a parallel, i.e. not pre-focussed light beam 5, and the polarization converter 9 is designed as a wave plate, for example as a λ/4 plate.

The deflection unit 2 is essentially composed of a polarization beam splitter 12, of a second polarization converter 13 and of a reflector 14. The optical elements are arranged following one another on the optical axis 3 and are combined with one another, for example by gluing, to form a compact unit.

The polarization beam splitter 12 has a polarization layer 17 that either reflects a polarized light beam or allows it to pass depending on the polarization direction. The polarization layer 17 is usually formed of a plurality of dielectric layers with different refractive indices. Alternatively, the polarization layer 17 can be composed of a polarizing film of plastic or some other suitable material. A glass plate or, as in the exemplary embodiment, a cube formed of two triangular prisms 18, 19 can be employed as a carrier for the polarization layer 17, whereby the polarization layer 17 is arranged in the region of those limiting surfaces of the triangular prisms 18, 19 that face toward one another.

The second polarization converter 13 is, for example, a birefringent plate that, together with the reflector 14, effects a 90° rotation of the polarization plane of a linearly polarized light beam.

In order to avoid the involved adjustment of the light beam 5 emerging from the stationary light source 1 in the direction of the optical axis, as mentioned in the introduction to the specification, the reflector 14 is designed according to the invention as a prism with at least two mirror faces residing at an angle of 90° relative to one another. Given such a prism, a light beam incident at an arbitrary angle in turn emerges from the prism parallel to the incident light beam deflected by 180°. As shown in the exemplary embodiment, a ridge prism, or a triple prism, or, triple mirror, can preferably be employed as the prism. A triple prism comprises three mirror faces residing at 90° relative to one another that abut at a mirror corner. After three-fold reflection, a light beam incident into the triple prism at an arbitrary angle returns parallel to the incident light beam deflected by 180°, whereby the directional reverse is invariant to a rotation of the triple prism around an arbitrary axis.

The beam splitter apparatus comprises an optical unit for focussing the sub-beams 6, 7 onto a reference plane.

In the illustrated exemplary embodiment, wherein a light beam 5 that is not pre-focussed is split, the first sub-beam 6 is focussed onto the reference plane by a lens 15 arranged in its beam path. Alternatively thereto, the lens 15 can also be arranged in the beam path of the light beam 5 between the lens system 8 and the deflection unit 2, for example in stationary fashion behind the first polarization converter 9 or in front of the polarization beam splitter 12 in the rotating deflection unit 2. The second sub-beam 7 is focussed onto the reference plane by a lens 16 arranged in its beam path. Alternatively thereto, the lens 16 can also be arranged in the rotating deflection unit 2 between polarization beam splitter 12 and reflector 14. A lens combination can also be employed instead of respectively one lens.

When, as in the illustrated exemplary embodiment, a light beam 5 that is not pre-focussed is split, the lenses employed for the focussing of the first and second sub-beam 6, 7 have identical optical parameters. When, by contrast, a light beam that is pre-focussed by means of a corresponding design and arrangement of the lens system 8, the corresponding lenses for focussing the first and second sub-beam 6, 7 have different optical parameters, whereby the focussing unit for one of the sub-beams 6, 7 can be entirely eliminated in this case.

Having described the structure of the beam splitter apparatus, the functioning thereof shall be explained in greater detail.

The linearly polarized light beam 5 generated by the light source 1 is first collimated by the lens system 8 and is then converted into a circularly polarized light beam 5 in the first polarization converter 9. What the circular polarization of the light beam 5 achieves is that the polarization effect of the polarization layer 17 of the polarization beam splitter 12 is independent of the respective rotational angle of the polarization beam splitter 12 or, of the rotating deflection unit 2.

The circularly polarized light beam 5 is incident onto the polarization layer 17 of the polarization beam splitter 12 and is divided thereat into two linearly polarized light components, whereby the luminous power of the light beam 5 is halved in nearly loss-free fashion. The first linearly polarized light component is reflected at the polarization layer 17 and forms the first sub-beam 6. When, as a result of an exact adjustment, the light beam 5 proceeds in the direction of the optical axis 3 and when the polarization layer 17 lies at an angle of 45°, then the first sub-beam 6 emerges from the deflection unit 2 perpendicular to the optical axis 3 and reaches the reference plane in the rated position. When an adjustment is lacking or when an adjustment was not carried out exactly, the light beam 5 is incident onto the polarization layer 17 at an angle relative to the optical axis 3. The first sub-beam 6 emerges from the deflection unit 2 with a corresponding angular deviation from the perpendicular and reaches the reference plane with a positional offset compared to the rated position.

The polarization layer 17 of the polarization beam splitter 12 allows the second linearly polarized light component 20 to pass and conducts it in the direction of the reflector 14 onto the second polarization converter 13 that modifies the polarization condition of the linearly polarized light component 20. The light component 20' is reflected at the reflector, whereby the polarization condition is again modified. The reflected light component 20' again passes through the second polarization converter 13, but in the opposite direction. A rotation of the polarization plane by 90° relative to the polarization plane of the light component 20 proceeding in the direction of the reflector 14 is thereby achieved, as a result whereof the light component 20' coming from the reflector 14 is reflected at the polarization layer 17 of the polarization beam splitter 12 as second sub-beam 7.

When, due to an exact adjustment, the light beam again proceeds in the direction of the optical axis 3, the second sub-beam 7 emerges from the deflection unit 2 perpendicular to the optical axis 3 and, after half a revolution of the deflection unit 2, reaches the reference plane, likewise in the rated position on a line.

When, due to a lacking or imprecise adjustment, by contrast, the light beam 5 enters into the polarization beam splitter 12 inclined by an angle relative to the optical axis 3, the light component allowed to pass is also incident onto the reflector 14 of the invention at this angle and is cast back by this into itself, i.e. upon retention of the respective angle, onto the polarization converter 13 and the polarization layer 17 of the polarization beam splitter 12. Although the second sub-beam 7 thereby still emerges from the deflection unit 2 with an angular deviation from the perpendicular, the angular deviation of the second sub-beam 7 has the same direction as the angular deviation of the first sub-beam 6 with reference to the rated position.

Due to the reflector 14 of the invention the angular errors now act identically on both sub-beams 6, 7, and the disturbing influence of the positional offset of the two sub-beams 6, 7 on, for example, the recording quality of a recorder is advantageously diminished.

Over and above this, the employment of the reflector (14) of the invention has the advantage that position tolerances that arise when the reflector is built into the deflection unit 2 are not critical with reference to the positional offset of the sub-beams 6, 7, by contrast to those of a plane mirror.

For complete correction of the positional offset of the two sub-beams 6, 7 and for simultaneous correction of potentially existing integration tolerances, it is additionally proposed that an automatic beam position correction be implemented in the rotating light deflector such that both sub-beams 6, 7 are always located in the rated position in the reference plane onto which both sub-beams 6, 7 are focussed.

In, for example, a recorder, a good recording quality is thereby achieved independently of angular errors of the light beam 5 incident onto the deflection unit 2 and of integration tolerances of the polarization beam splitter 12 i.e. without involved manual adjustments.

The automatic beam position correction advantageously occurs by modification of the angle of inclination of the polarization layer 17 of the polarization beam splitter 12 and/or by shifting at least one of the lenses 15, 16 essentially in the direction of the optical axis 3.

The modification of the angle of inclination of the polarization layer 17 of the polarization beam splitter 12 is achieved by tilting the polarization beam splitter or by tilting the entire deflection unit 2 when polarization beam splitter 12, polarization converter 13 and reflector 14 are compactly combined with one another to form a unit.

Figure 2:
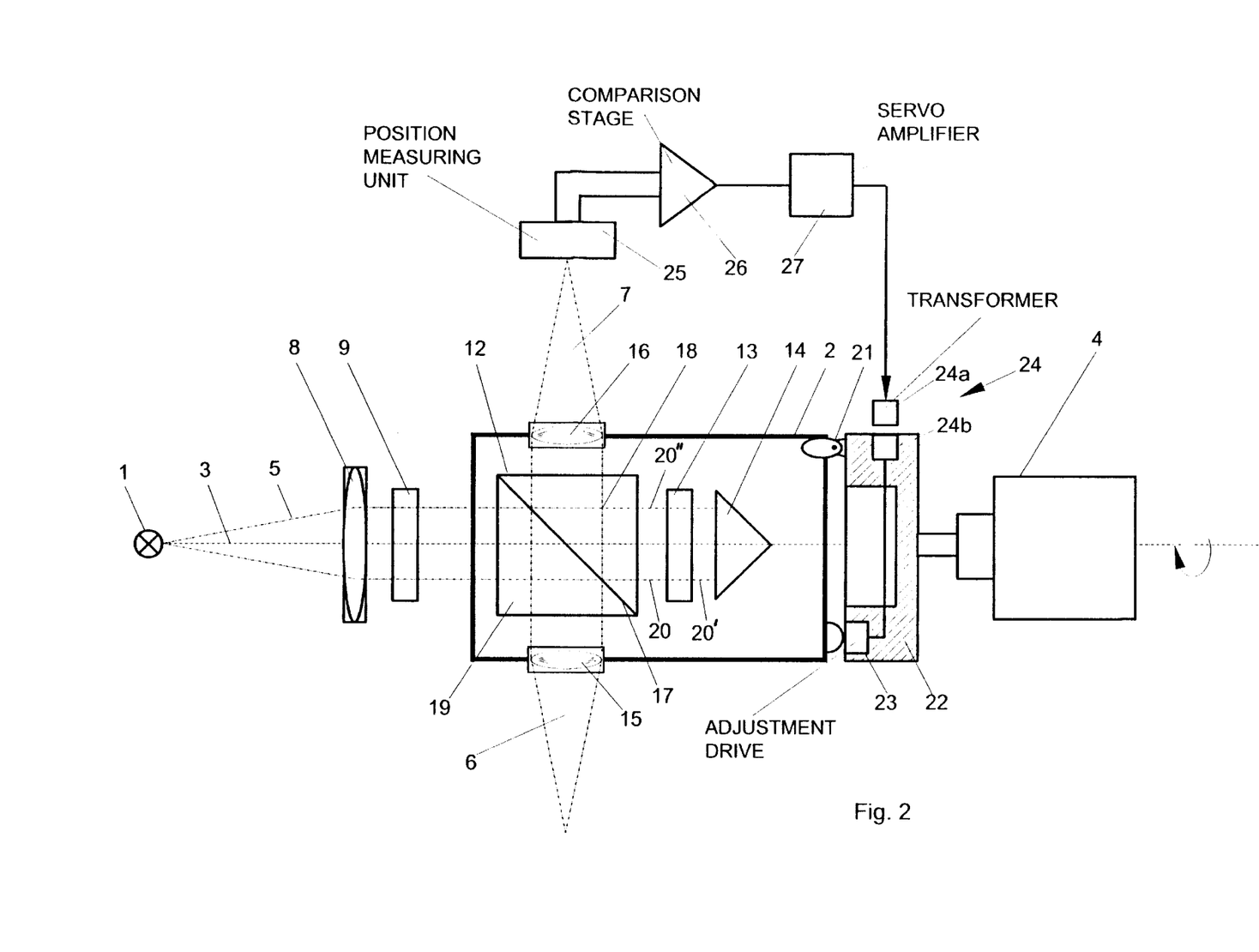
FIG. 2 is an exemplary embodiment of a beam splitter apparatus with a beam position correction.

FIG. 2 shows an exemplary embodiment of a beam splitter apparatus wherein polarization beam splitter 12, polarization converter (13) and reflector 14 are compactly joined to one another, and whereby a tilt angle control of the entire rotating deflection unit 2 is implemented for the automatic beam position correction, so that a change of the angle of inclination of the polarization layer 17 and a shift of the lenses 15, 16 occur simultaneously. As a result of the automatic beam position correction, the reflector 14 can be designed as a plane mirror or, as shown, as a triangle prism or, respectively, as a triple prism.

With a bearing 21, the entire deflection unit 2 is seated at a cylindrical carrier 22 tiltable around the optical axis 3, An adjustment drive 23 for tilting the deflection unit is built into the carrier 22, as is the winding 24a of at least one transformer 24 whose other winding 24b is stationarily arranged at a distance from the carrier 22. The mechanical structures of bearing 21, carrier 22 and adjustment drive 23 must be designed such that a rotational-symmetrical mass distribution is achieved. For example, the adjustment drive 23 is a piezo drive or a suitable magnetostrictive drive. Such drives are commercially obtainable. The transformer 24, for example, is an electromagnetic transformer with which an energy transmission for the piezo drive, which requires less than 1 mW power, can be realized without further ado.

The acquisition of the positional offsets of the two sub-beams 6, 7 relative to one another and the determination of appropriate correction values for the beam position correction can occur in a variety of ways.

The positional offsets of the sub-beams 6, 7 relative to one another in the reference plane (focus plane) can, for example, be measured with a position-measuring unit 25, as shown in the exemplary embodiment. For example, the position-measuring unit 25 is designed as a differential photodiode with two light-sensitive surfaces separated from one another. The boundary line between the light-sensitive surfaces of the differential photodiode extends in the deflection direction of the sub-beams 6, 7 and is located in the rated position for the two sub-beams 6, 7. The photocurrents of the differential photodiode generated by the incident sub-beams 6, 7 are supplied to a comparison stage 26 that generates positional error values as a criterion for the positional offset of the sub-beams 6, 7 perpendicular to the deflection direction. Such a position-measuring unit is disclosed in detail in, for example, EP-B-0 054 170.

The positional error values are supplied to a servo amplifier 27 that is connected to the stationary winding 24a of the transformer 24. The positional error values are converted into corresponding correction values in the servo amplifier that determine the needed direction and amplitude of the adjustment of the adjustment drive 23. For energy transmission to the adjustment drive 23, a primary alternating voltage is generated from the correction values and this is supplied to the stationary winding 24a. The primary alternating voltage induces a secondary alternating voltage in the rotating winding 24b of the transformer that is converted into a d.c. voltage in a rectifier. The d.c. voltage supplied to the adjustment drive 23 effects a corresponding tilting of the deflection unit 2 until a tilt angle is reached at which the two sub-beams 6, 7 are located in the rated position in the reference plane.

The correction values needed for the correction of the positional offset of the sub-beams 6, 7 are determined, for example, in a measuring phase preceding the actual operation and are stored in the servo amplifier 27. During operation, the stored correction values are then transmitted to the adjustment drive 23 for ongoing position correction of the two sub-beams 6, 7.

The measurement of the positional offset of the sub-beams 6, 7 with the position-measuring unit is undertaken at a separate measurement location for the beam splitter apparatus, but preferably in the same device into which the beam-splitter apparatus is built. When the beam splitter apparatus is employed in an exposer or recorder, the reference surface for measuring the positional offset is the exposure plane on which the film material to be exposed is arranged. In this case, the position error values or, correction values for the beam position correction can also be alternatively determined for measuring the positional error such that a film first is exposed stripe-like in the recorder (exposer) with different, predetermined correction values, and the exposed film is visually or mensurationally interpreted for determining the optimum correction value.

It is basically adequate to provide only one transformer 24 at the circumference of the carrier 22 and to transmit only one correction value per revolution to the piezo drive since this has a capacitative behavior. Due to the rotational-symmetrical mass distribution, however, it is expedient to provide a plurality of transformers 24 or, a plurality of windings 24*b* rotating with the carrier 22 and stationary windings 24*a*.

If a simultaneous shift of the lenses 16, 17 should not occur given the tilting of the deflection unit 2, the deflection unit 2 of FIG. 2 can be correspondingly structurally modified. For that purpose the lenses 15, 16 can be seated, for example, in a cylindrical lens mount open at one side that envelopes the components of the deflection unit 2 and whose one end face is secured to the outside surface of the carrier 22, so that the lens mount does not follow the tilt motion of the deflection unit 2.

It lies within the framework of the invention to correct the positional offsets of the sub-beams 6, 7 with an ongoing control during operation in that the positional offsets are continuously measured and corresponding correction values are transmitted to the rotating deflector 2.

Figure 3:
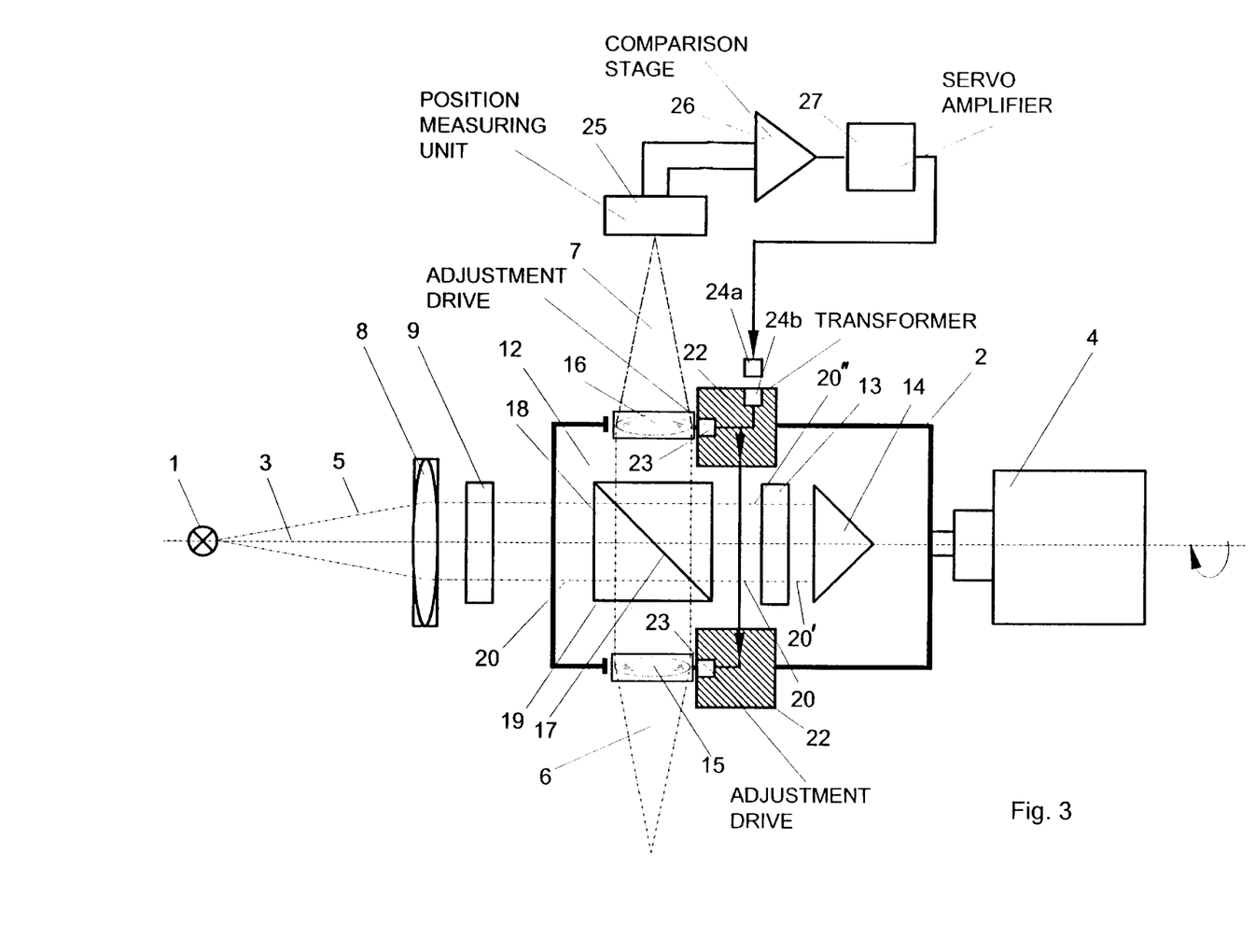
FIG. 3 is another exemplary embodiment of the beam splitter apparatus with a beam position correction.

FIG. 3 shows a further exemplary embodiment of a beam splitter apparatus wherein the automatic beam position correction is implemented by shifting the lenses 15, 16 in the direction of the optical axis 3 with the adjustment drives 23. In this embodiment, too, the reflector 14 can be designed as a plane mirror or, as shown, as a triangle prism or triple prism. The measurement of the positional offsets of the sub-beams 6, 7 and the transmission of the corresponding correction values to the adjustment drives occurs in the way described in FIG. 2.

Figure 4:
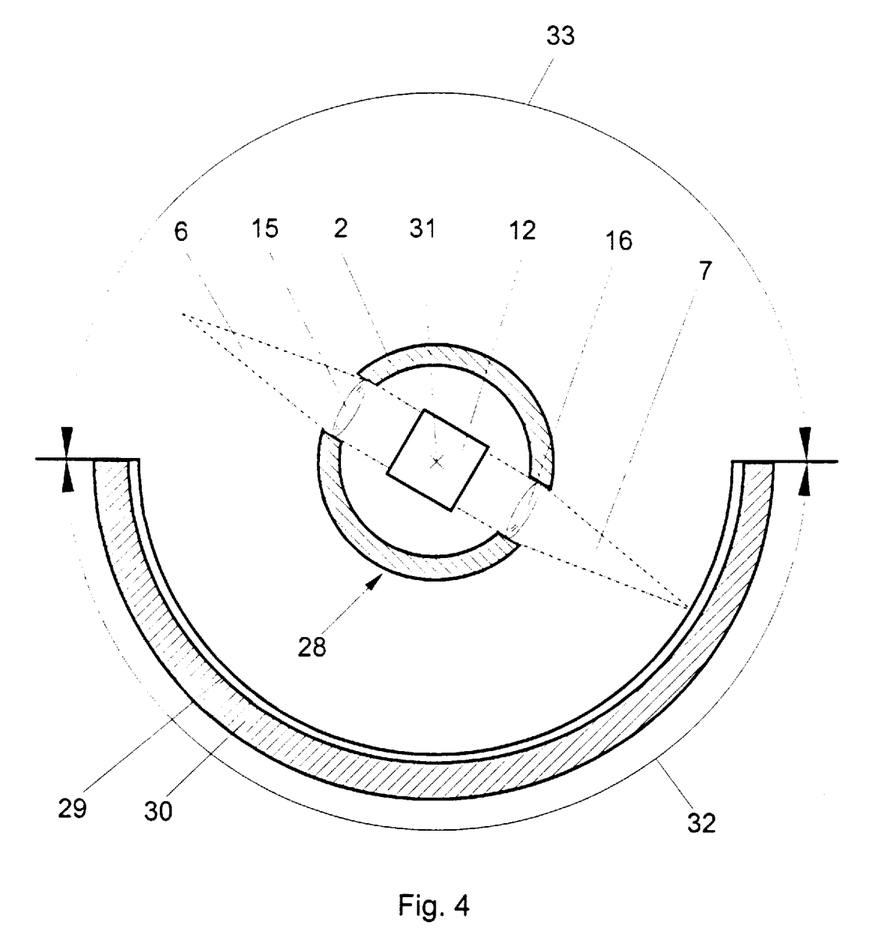
FIG. 4 is an applied example of the beam splitter apparatus.

FIG. 4 shows an applied example of the inventive beam splitter apparatus of the invention in a scanner unit 28 of a recorder exposer working according to the inside drum principle. In such an inside drum recorder, the recording material 29 is fixed to the inside wall of a cylinder segment as an exposure trough 30. The scanner unit 28 rotates around the longitudinal axis 31 of the exposure trough 30. The scanner unit 28 comprises the beam splitter apparatus shown in FIG. 1. The sub-beams 6, 7 are brightness-modulated by an image signal and are conducted over the recording material 29 point-by-point and line-by-line for exposure. The scanner unit 28 thereby moves in the direction of the longitudinal axis 31 on the basis of a drive not shown. Each revolution of the light beam deflection unit is divided into a working region 32 or working time interval and a return region 33 or a return time interval. While the one sub-beam 6 or 7 is active and sweeps the working region 32 from the start of a line to the end of the line for exposing the recording material 29, the inactive sub-beam 7 or 6 is returned in the return region 33 to the start of the next line. The degree of utilization of the exposer is doubled by the recording with two sub-beams 6, 7.

In the beam splitter apparatus described up to now for employment in exposers, the two exposing sub-beams 6, 7 each have respectively 50% of the luminous power of the input light beam 5 supplied to the beam splitter apparatus. However, a higher luminous power is often required for exposing specific materials. In order to achieve a higher luminous power, it is proposed according to the invention that the creation of the respectively inactive sub-beam 6 or, 7 be prevented during the return interval, so that no division of the luminous power ensues and the active sub-beam 7 or, 6 comprises nearly the full luminous power of the input light beam 5.

Figure 5:
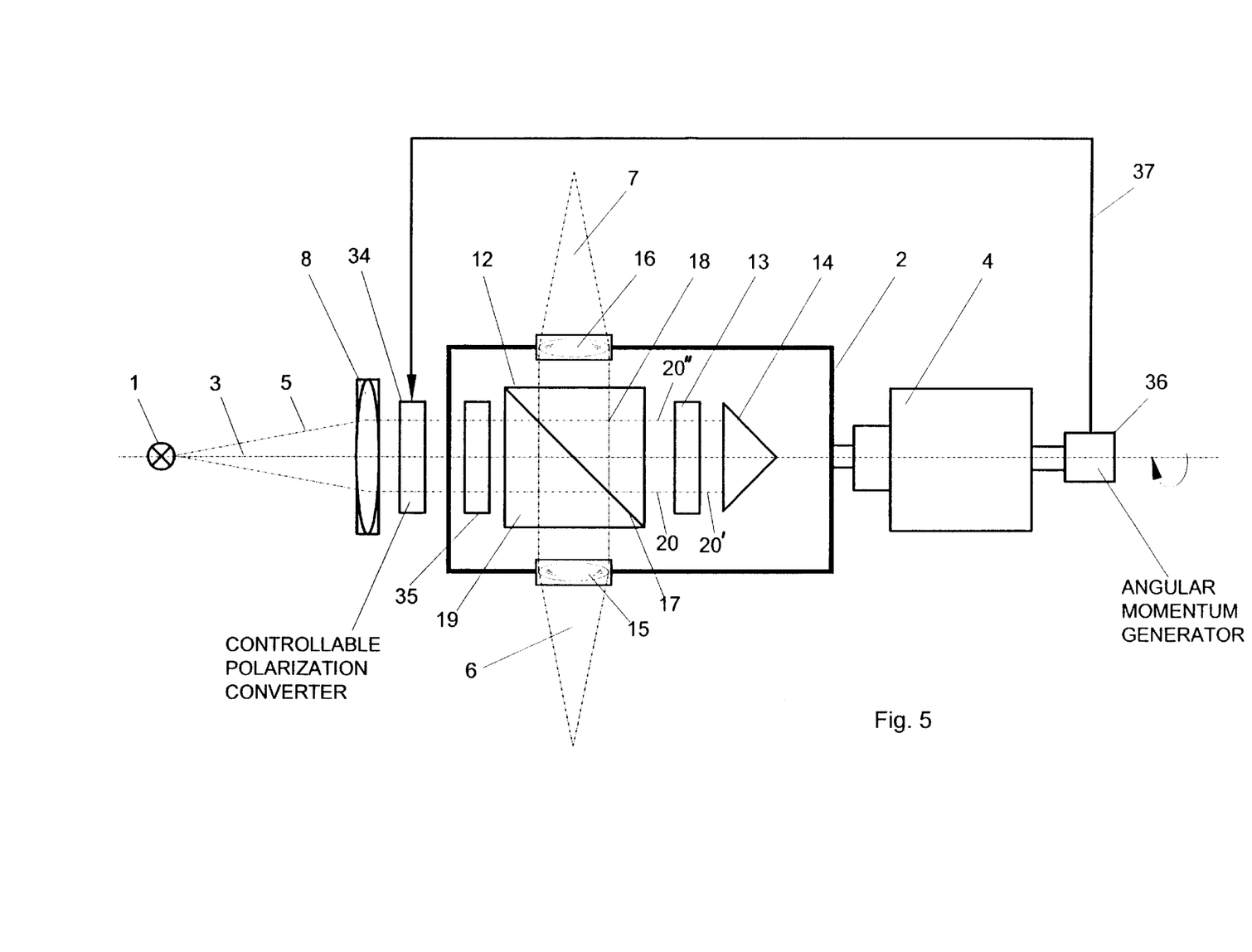
FIG. 5 is a development of the beam splitter apparatus.

FIG. 5 shows an advantageous development of a beam splitter apparatus with an inactive sub-beam 6 or, 7 that can be shut off in the respective return interval for increasing the luminous power of the respectively active sub-beam 7 or, 6.

The beam splitter apparatus of FIG. 5 differs from that according to FIG. 1 in that the stationary, first polarization converter 9 is replaced by a controllable polarization converter 34, and in that a polarization converter 35 that can be connected to the polarization beam splitter 12, for example by gluing, is arranged in the rotating deflection unit 2 preceding the polarization beam splitter 12. Further, a programmable angular momentum generator 36 that is mechanically connected to the motor 4 and supplies a two-level control signal to the controllable polarization converter 34 via a line 37 is arranged on the optical axis.

The angular momentum generator 36 is programmable such that, in every revolution of the deflection unit 2, the two-level control signal assumes the one signal level during the working region (FIG. 4; 32) of the one sub-beam 6 or, 7 and assumes the other signal level during the return region (FIG. 4; 33) of the other sub-beam 7 or 6. The lengths of the work regions and of the return regions of the sub-beams 6, 7 can thus be advantageously defined independently of one other by the type of programming.

The controllable polarization converter 34 contains an electro optical modulator that converts the linear polarization of an incident light beam into a circular polarization and switches the rotational sense of the circular polarization dependent on the respective signal level of the control signal on the line 37. The polarization converter 34 is fashioned as wave plate, for example as a λ/4 plate.

The linear polarization of the light beam 5 coming from the light source 1 is first converted into a circular polarization in the controllable polarization converter 34. The rotational sense of the circular polarization is then switched dependent on the respective signal level of the control signal. The conversion of the linear polarization of the light beam 5 into the circular polarization and the change of the rotational sense of the circular polarization can, of course, also be undertaken in separate assemblies.

In the polarization converter 35 rotating with the deflection unit 2, the circular polarization of the light beam 5 is converted—depending on the respective rotational sense of the circular polarization—into a linear polarization with a first polarization condition, for example a linear polarization with a 0° polarization plane, or with a second polarization condition, for example into a linear polarization with a 90° polarization plane.

When the linearly polarized light beam 5 exhibits the first polarization condition, the light beam 5 is reflected at the polarization layer 17 of the polarization beam splitter 12, but is not allowed to pass therethrough, so that only the first sub-beam 6 arises with nearly the full luminous power of the light beam 5. When, by contrast, the light beam 5 exhibits the second polarization condition, the light beam 5 is allowed to pass by the polarization layer 17 of the polarization beam splitter 12 but is not reflected thereat, so that only the second sub-beam 7 is formed with nearly the full luminous power of the light beam 5.

The beam splitter apparatus of the invention can be employed in recording devices of the inside drum type or of the flatbed type. It also lies within the scope of the invention to utilize the beam splitter apparatus in originals scanner means.

Although various minor changes and modifications might be proposed by those skilled in the art, it will be understood that my wish is to include within the claims of the patent warranted hereon all such changes and modifications as reasonably come within my contribution to the art.

I claim:

1. An apparatus for splitting a light beam into a first and a second sub-beam, comprising:

a stationary light source for generating a light beam on an optical axis;

an objective arranged in the optical axis in front of the light source;

a deflection unit rotatable about the optical axis, said light beam being incident onto said deflection unit;

a polarization beam splitter in said deflection unit arranged on the optical axis for dividing the light beam into a first polarized light component as said first sub-beam reflected by said polarization beam splitter substantially perpendicular to the optical axis and into a second polarized light component transmitted by said polarization beam splitter substantially in a direction of the optical axis, a polarization converter and a reflector being arranged on the optical axis behind said polarization beam splitter for phase turning the second light component by 90° in phase with respect to a polarization direction and for reflecting the phase-turned second beam component back to the polarization beam splitter at which the phase-turned second beam component is reflected as said second sub beam substantially perpendicular to said optical axis;

respective focusing units in said deflection unit for focusing said first and second sub-beams onto respective surfaces;

for correcting relative positional offsets of the first and second sub-beams relative to one another, the reflector comprising a prism with at least two mirror faces residing at an angle relative to one another for reflecting the phase-turned second beam component back to said polarization converter after the second beam component has passed through the polarization converter to said prism.

2. An apparatus according to claim 1 wherein the two mirror faces reside at an angle of 90° relative to one another.

3. The apparatus according to claim 1 wherein the prism is designed as a triangle prism.

4. The apparatus according to claim 3 wherein at least two mirror faces of the triangle prism are at an angle of 90° to one another.

5. The apparatus according to claim 1 wherein the prism is designed as a triple prism.

6. The apparatus according to claim 5 wherein at least two mirror faces of the triple prism are at 90° relative to one another.

7. The apparatus according to claim 1 wherein the focusing unit for the first sub-beam comprises at least one lens in the beam path of the first sub-beam.

8. The apparatus according to claim 1 wherein the focusing unit for the second sub-beam comprises at least one lens in the beam path of the second sub-beam.

9. The apparatus according to claim 1, further comprising:

means for determining a relative positional offset of at least one of the sub-beams at a reference surface impinged by the sub-beam and for a determining a correction value corresponding to the determined positional offset;

means for transmission of the correction value to the deflection unit; and means for changing an angle of inclination of the polarization beam splitter of the deflection unit relative to the optical axis depending on the transmitted correction value for correcting relative positional offsets of the sub-beams.

10. The apparatus according to claim 9, wherein:

the angle of inclination of the polarization beam splitter is changeable by tilting the deflection unit relative to the optical axis; and the means for changing the angle of inclination of the polarization beam splitter is an adjustment drive which is in an interactive connection with the deflection unit and controllable by said transmitted correction value for tilting said deflection unit.

11. The apparatus according to claim 10, wherein the adjustment drive comprises a piezo drive.

12. The apparatus according to claim 10 wherein the adjustment drive comprises a magnetostrictive drive.

13. The apparatus according to claim 9 wherein the means for determining the relative positional offset of the at least one sub-beam and for determining the correction value corresponding to the determined positional offset comprises a position-measuring unit arranged at said reference surface struck by the sub-beam.

14. The apparatus according to claim 13 wherein a differential photo diode is employed as the position-measuring unit.

15. The apparatus according to claim 9 wherein the means for the transmission of the correction value to the deflection unit comprises an electro-magnetic transformer.

16. The apparatus according to claim 1 further comprising:

means for determining a relative positional offset of at least one of the sub-beams at a reference surface impinged by the sub-beam and for determining a correction value corresponding to the determined positional offset;

means for transmission of the correction value to the deflection unit; and means for shifting a position of said at least one focusing unit depending on the transmitted correction value for correcting relative positional offsets of the sub-beams.

17. The apparatus according to claim 16 wherein the means for changing the angle of inclination of the focusing units comprises an adjustment drive at each focusing unit controllable by the correction value.

18. The apparatus according to claim 17 wherein the adjustment drive comprises a piezo drive.

19. The apparatus according to claim 17 wherein the adjustment drive comprises a magnetostrictive drive.

20. The apparatus according to claim 16 wherein the means for determining the relative positional offset of the at least one sub-beam and for determining the correction value corresponding to the determined positional offset comprises a position-measuring unit arranged at the reference surface of the sub-beam.

21. The apparatus according to claim 20 wherein a differential photo diode is employed as the position-measuring unit.

22. The apparatus according to claim 16 wherein the means for transmission of the correction value to the deflection unit comprises an electro-magnetic transformer.

23. The apparatus according to claim 1 wherein the light source generates a circularly polarized light beam.

24. The apparatus according to claim 1 wherein:
the light source generates a linearly polarized light beam; and
a further polarization converter for converting the linear polarization of the light beam into a circular polarization is arranged on the optical axis between the light source and the rotating deflection unit.

25. The apparatus according to claim 24 wherein the polarization converter and the further polarization converter are designed as birefringent plates.

26. The apparatus according to claim 23 wherein the birefringent plates are $\lambda/4$ plates.

27. The apparatus according to claim 1 for increasing luminous power of the respectively active first and second sub-beams further comprising:
a further polarization converter stationarily arranged in the optical axis in front of the deflection unit and controllable by a control signal for switching over a rotational direction of a circular polarization of a circular polarized light beam depending on said control signal;
another polarization converter arranged in the optical axis and on the deflection unit in front of the polarization beam splitter for converting said circular polarized light beam into a linear polarized light beam having a first polarization plane or a second polarization plane depending on a respective rotational direction of the circular polarization of the circular polarized light beam;
the converted linear polarized light beam having said first polarization plane is reflected by the polarization beam splitter as said first polarized light component for generating said active first sub-beam, but is not transmitted as said second polarized light component to generate said second sub-beam; and
the converted linear polarized light beam having said second polarization plane is transmitted through the polarization beam splitter as said second polarized light component for generating said active second sub-beam, but is not reflected as said first polarized light component to generate said first sub-beam.

28. The apparatus according to claim 27 wherein the controllable further polarization converter is designed as an electro-optical modulator.

29. The apparatus according to claim 27 wherein the further converter is designed as a wave plate.

30. The apparatus according to claim 27 wherein an angular momentum generator is coupled with the deflection unit for generating the control signal for the further polarization converter, the control signal determining a working interval in which one of the sub-beams is activated and the other sub-beam is de-activated in every revolution of the deflection unit.

31. An apparatus for splitting a light beam into first and second sub-beams, comprising:
a light source for generating a light beam along an optical axis;
an objective arranged on the optical axis in front of the light source;
a deflection unit receiving the light beam passing through the objective and rotatable around the optical axis, said deflection unit having:
a polarization beam splitter for dividing the polarized light beam into a reflective, polarized light component as said first sub-beam that proceeds substantially perpendicular to the optical axis, and into a polarized light component that is allowed to pass and proceeds substantially in a direction of the optical axis;
a polarization converter and a reflector after the polarization converter arranged on the optical axis behind the polarization beam splitter, the polarization converter turning the light component as it passes through the converter by 90° in phase with respect to the polarization direction, and the reflector reflecting the light component passing through the polarization converter back through the polarization converter and to the polarization beam splitter where it is reflected at the polarization beam splitter to form said second sub-beam; and
the reflector comprising a three sided triangular prism having a face running perpendicular to the optical axis and facing the polarization converter, said reflector being designed such that the light beam incident at an arbitrary angle in turn emerges from the prism parallel to the incident light beam and deflected by 180°.

32. The apparatus according to claim 31, wherein said triangular prism has at least two mirror faces at 90° relative to one another.

33. An apparatus for splitting a light beam into first and second sub-beams, comprising:
a light source for generating a light beam along an optical axis;
an objective arranged on the optical axis in front of the light source;
a deflection unit receiving the light beam passing through the objective and rotatable around the optical axis, said deflection unit having:
a polarization beam splitter for dividing the polarized light beam into a reflective, polarized light component as said first sub-beam that proceeds substantially perpendicular to the optical axis, and into a polarized light component that is allowed to pass and proceeds substantially in a direction of the optical axis;
a polarization converter and a reflector arranged on the optical axis behind the polarization beam splitter, the polarization converter turning the light component as it passes through the converter by 90° in phase with respect to the polarization direction, and the reflector reflecting the light component passing through the polarization converter back through the polarization converter and to the polarization beam splitter where it is reflected at the polarization beam splitter to form said second sub-beam;

respective focusing units for the first and second sub-beams;

a position measuring unit for determining a relative positional offset of at least one of the sub-beams on a reference surface and for determining a correction value corresponding to the determined positional offset; and a unit for changing at least one of angle of inclination of the polarization beam splitter relative to the optical axis or position of the focusing units for the sub-beams dependent on the correction value for correcting relative positional offset of the sub-beams.

34. The apparatus according to claim 33 wherein the reflector has at least two mirror faces arranged at 90° relative to one another.

* * * * *